United States Patent [19]

Zeitsch

[11] Patent Number: 4,673,464

[45] Date of Patent: Jun. 16, 1987

[54] DISTILLATION AND ABSORPTION COLUMN TRAYS

[75] Inventor: Karl J. Zeitsch, Cologne, Fed. Rep. of Germany

[73] Assignee: Fried. Krupp Gesellschaft mit beschrankter Haftung, Essen, Fed. Rep. of Germany

[21] Appl. No.: 682,919

[22] Filed: Dec. 18, 1984

[30] Foreign Application Priority Data

Dec. 23, 1983 [DE] Fed. Rep. of Germany ....... 3346740

[51] Int. Cl.⁴ .............................................. B01D 3/22
[52] U.S. Cl. ................................ 202/158; 261/114.1; 261/114.5
[58] Field of Search ....... 261/114 R, 114 TC, 114 JP, 261/114 A, 114 VT; 196/14.52; 202/158; 422/255–257; 52/673

[56] References Cited

U.S. PATENT DOCUMENTS

| | | | |
|---|---|---|---|
| 2,301,707 | 11/1942 | Rocke | 261/114 R |
| 2,540,781 | 2/1951 | Glitsch | 261/114 TC |
| 2,714,504 | 8/1955 | Bowles | 261/114 R |
| 2,732,194 | 1/1956 | Jackson | 261/114 A |
| 2,924,441 | 2/1960 | Osborne | 202/158 X |
| 3,325,155 | 6/1967 | Bahout | 261/114 VT |
| 3,464,679 | 9/1969 | Becker | 261/114 R |
| 3,729,179 | 4/1973 | Keller | 261/114 R |
| 4,305,895 | 12/1981 | Heath et al. | 261/114 R X |

FOREIGN PATENT DOCUMENTS 1253672 5/1968 Fed. Rep. of Germany .

OTHER PUBLICATIONS

Third International Symposium on Distillation; The Institution of Chemical Engineers, Symposium Series No. 56, Rugby, England, vol. 1, pp. 2.4/1–2.4/16, 2.4/45–2.4/63, 1979.

"Handbook of Engineering Mechanics", edited by Flügge, McGraw-Hill Book Co., New York, N.Y. (1962), Chapter 61.8, pp. 61-21 to 61-34.

*Primary Examiner*—Richard L. Chiesa
*Attorney, Agent, or Firm*—Sughrue, Mion, Zinn, Macpeak, and Seas

[57] ABSTRACT

A distillation or absorption column tray whose characteristic frequency is a specific function of the radius of circular apertures in its bottom wall, of the surface tension of the body of liquid therein at the operating temperature of the column and of the density of such liquid. This reduces the amplitude of vibrations of the tray under the action of ascending vapors and/or gases and hence increases the useful life of the tray.

13 Claims, 5 Drawing Figures

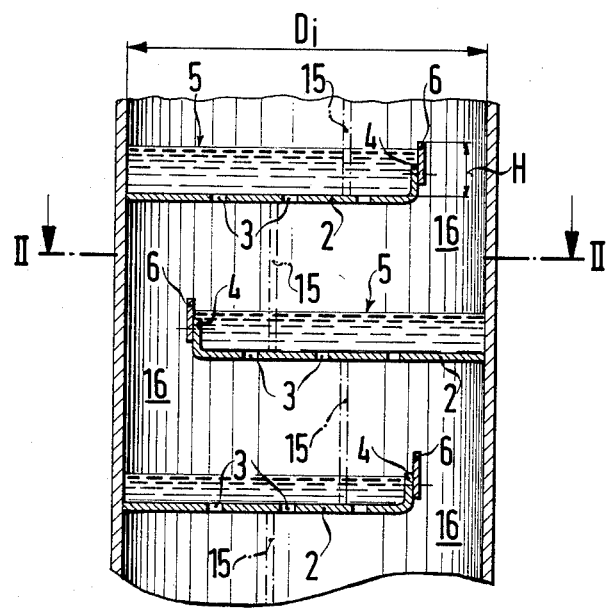
FIG. 1
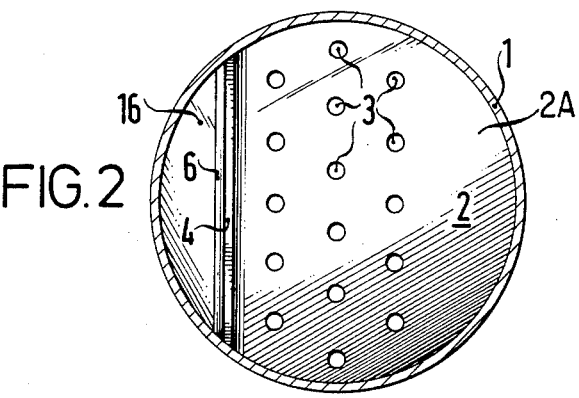
FIG. 2
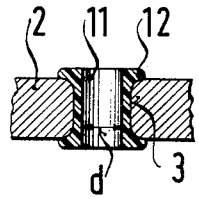
FIG. 5
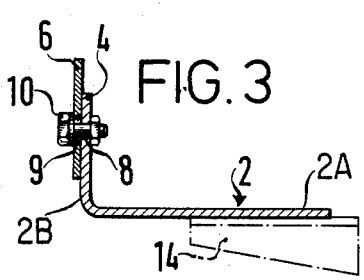
FIG. 3
FIG. 4

DISTILLATION AND ABSORPTION COLUMN TRAYS

BACKGROUND OF THE INVENTION

The present invention relates to distillation columns, absorption columns and similar apparatus in general, and more particularly to improvements in trays which are utilized in such columns to confine bodies of liquid media at different levels of the tubular housings or shells of the columns. Still more particularly, the invention relates to improvements in trays of the type wherein the bottom wall is formed with substantially circular openings for the passage of vapor and/or gases and wherein the bottom wall can carry a weir for the flow of liquid medium into the tray at the next lower level in the housing or shell of the respective column.

Trays of the above outlined character are utilized in columns wherein the descending liquid medium should be brought into intimate and large-area contact with ascending vapors or gases, especially wherein the liquid medium should be contacted by large quantities of vapors or gases with relatively small losses in the pressure of the ascending vapors and/or gases. Trays of the above outlined character are disclosed, for example, in German Pat. No. 12 53 672.

It is well known that the trays in the shell of a distillation or absorption column are prone to highly pronounced vibration during contact between the liquid medium and the ascending vapors and/or gases and, at certain amplitudes, such vibration can lead to the development of cracks, fatigue and rapid destruction of the trays as well as of the entire column. The problems which arise as a result of vibration of trays in distillation and absorption columns are discussed, for example, by R. J. P. Brierley, P. J. M. Whyman and J. B. Erskine in the article entitled "Flow-Induced Vibration of Distillation and Adsorption Column Trays", Third International Symposium on Distillation, 1979 (published by The Institution of Chemical Engineers, Rugby, United Kingdom, Volume I, pages 2.4/45 to 2.4/63). Reference may also be had to the article by G. H. Priestman, D. J. Brown and H. K. Kohler entitled "Pressure Pulsations in Sieve-Tray Columns", Third International Symposium on Distillation, 1979 (published by The Institution of Chemical Engineers, Rugby, United Kingdom, Volume I, pages 2.4/1 to 2.4/16).

Cracking, aging and/or other damage to trays and/or columns not only entails substantial production losses but also necessitates fresh investments in capital. Moreover, claims for damages by the purchasers of such columns can be ruinous to the manufacturer. In spite of the recognition and detailed discussion of the problem, the makers of such trays failed to find a solution mainly because the cause of pronounced vibrations was unknown and, therefore, it was impossible to forestall such vibrations by appropriate design of the trays prior to assembly of the columns. The only solution which was known to the makers of such equipment was direct experience with previously erected columns, the undertaking of remedial measures in erected columns, and copying of the thus modified columns. Thus, in the case of a new column not based on previous experience, the manufacturer was never sure that the column would not vibrate at an excessive amplitude such as would give rise to aging, cracking and other deleterious effects upon the useful life of the trays and of the entire column. Moreover, remedial measures to reduce or eliminate vibrations of trays in erected columns constitute a hit-and-miss proposition, primarily due to the lack of knowledge of exact causes of such vibrations and/or of reliable measures for their elimination.

Recent experiments have led to the discovery that, when a vapor or gas ascends through the circular apertures of a series of superimposed trays in the shell of a column which is operated in the normal way, the entire flow of vapor or gases through the bottom wall of a tray is composed of a plurality of jet type flow pulses with a duration $$\tau = \frac{2}{3} \sqrt{\frac{\rho_L R^3}{2\sigma}}$$

wherein $\rho_L$ denotes the density of the liquid medium, R is the radius of an aperture in the bottom wall of the tray and $\sigma$ is the surface tension of the liquid medium. It was found that such pulses induce pronounced vibrations of the trays.

OBJECTS AND SUMMARY OF THE INVENTION

An object of the invention is to provide a novel and improved column, particularly a distillation or absorption column, whose trays can stand longer periods of use than heretofore known trays.

Another object of the invention is to provide a novel and improved tray which can be used in distillation columns, absorption columns or analogous apparatus as a superior and longer-lasting substitute for conventional trays.

A further object of the invention is to provide novel and improved means for prolonging the useful life of conventional trays.

An additional object of the invention is to provide novel and improved methods of prolonging the useful lives of trays in existing columns.

Still another object of the invention is to provide a tray which is held against excessive vibrations in actual use of a column in a novel and improved way.

A further object of the invention is to provide a novel and improved mode of selecting optimum characteristic frequencies of trays for use in distillation columns, absorption columns and like apparatus.

Another object of the invention is to provide a tray which can be constructed and assembled, prior to its installation in the shell of a column, in such a way that it is automatically protected against excessive vibratory and analogous stray movements when the apparatus employing the tray is in actual use.

One feature of the invention resides in the provision of a liquid-containing tray for use in distillation columns, absorption columns and like apparatus. The tray comprises a bottom wall having circular apertures and a characteristic frequency $$f_B = \frac{3n}{2} \sqrt{\frac{2\sigma}{\rho_L R^3}}$$

wherein n is a whole number including one, $\sigma$ is the surface tension of the body of liquid which is contained on the tray at the operating temperature of the column, $\rho_L$ is the density of such liquid at the operating temperature of the column, and R is the radius of apertures in the bottom wall of the tray.

The tray preferably further comprises a weir which extends upwardly from the bottom wall and has a substantially vertically adjustable second wall and means for adjustably securing the second wall to the bottom wall.

The tray can further comprise inserts which are removably installed in the bottom wall and define at least some of the apertures. Such inserts can be used to convert a tray with relatively large apertures into a tray with smaller apertures, depending upon whether the inserts are installed into or removed from the bottom wall of the tray. The inserts can be made of an elastomeric material, such as rubber or a synthetic plastic substance. Each insert can include a hollow core which extends between the upper side and the underside of the bottom wall of the tray, a first flange disposed at one end of the core and adjacent to the upper side of the bottom wall and a second flange disposed at the other end of the core and adjacent to the underside of the bottom wall.

The tray can further comprise reinforcing means for the bottom wall. Such reinforcing means can be adjacent to the underside of the bottom wall and can comprise one or more profiled reinforcing elements and means for securing the reinforcing element or elements to the bottom wall. The reinforcing means can also comprise at least one anchoring element serving to secure the tray to the shell of the column and/or to a neighboring tray. Alternatively, the reinforcing means can include nozzles or nipples which define portions of the apertures and extend beyond the upper side and/or beyond the underside of the bottom wall.

Another feature of the invention resides in the provision of a column, particularly a distillation or absorption column, which comprises an upright tubular housing or shell and a plurality of neighboring liquid-containing trays disposed at different levels in the interior of the shell. Each tray includes a bottom wall having circular apertures and a characteristic frequency which satisfies the equation $$f_\beta = \frac{3n}{2} \sqrt{\frac{2\sigma}{\rho_L R^3}}$$

wherein n is a whole number including one, $\sigma$ is the surface tension of the body of liquid which is contained on the trays at the operating temperature of the column, $\rho_L$ is the density of such liquid at the operating, temperature of the column and R is the radius of apertures in the bottom walls of the trays. The trays are staggered with reference to each other and have weirs for the overflow of liquid from tray to tray.

The novel features which are considered as characteristic of the invention are set forth in particular in the appended claims. The improved tray itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary central vertical sectional view of a column having a series of staggered trays which are constructed in accordance with an embodiment of the invention;

FIG. 2 is a horizontal sectional view as seen in the direction of arrows from the line II—II of FIG. 1;

FIG. 3 is an enlarged view of a detail in FIG. 1, showing the manner in which the wall of the weir is adjustably connected with the bottom wall of the respective tray;

FIG. 4 is a fragmentary sectional view of the bottom wall of a modified tray; and FIG. 5 is a fragmentary sectional view of the bottom wall of a tray, showing an insert which can be used to change the effective cross section of an aperture in the bottom wall.

DESCRIPTION OF THE PREFERRED EMBODIMENTS

FIGS. 1 and 2 show a portion of the housing or shell 1 of an upright distillation or absorption column which has an inner diameter Di and contains a series of spaced-apart trays 2 each of which is constructed and installed in accordance with a first embodiment of the invention. Each tray 2 comprises a bottom wall 2A which has an array of circular apertures 3 each having a radius R. Each tray 2 is installed in such a way that it extends across the major portion of the cross-sectional area of the interior of the shell 1 and thus leaves an opening 16 for the overflow of a liquid medium from each upper tray 2 onto the tray 2 therebelow. The trays 2 are staggered in such a way that the liquid medium which overflows from an upper tray is intercepted by the next-lower tray, and so forth. Each bottom wall 2A is separably and adjustably connected with the substantially vertical (second) wall 6 of a weir 4 which further includes an upwardly bent portion 2B of the respective bottom wall 2A. The means for vertically adjustably connecting each bottom wall portion 2B to the wall 6 of the respective weir 4 comprises a set of fasteners 10 (only one shown in FIG. 3) including nuts and bolts whose shanks extend through vertically extending slots 9 of the second walls 6 and circular openings or holes 8 in the wall portions 2B. It is clear that the slots 9 can be provided in the wall portions 2B and the holes 8 can be provided in the adjustable walls 6 without departing from the spirit of the invention.

The reference characters 5 denote in FIG. 1 the top surfaces of bodies of liquid in the respective trays 2. The height H of each such body of liquid medium is determined by the selected position of the corresponding wall 6.

The adjustable weirs 4 of FIGS. 1 to 3 can be replaced with fixed weirs if the trays are equipped with spool- or reel-shaped inserts 11 of the type shown in FIG. 5. Each such insert is preferably made of an elastomeric material (e.g., rubber or a synthetic plastic substance) and includes a hollow cylindrical core which extends between the upper side and the underside of the respective bottom wall, an upper annular flange 12 which overlies the upper side of the bottom wall, and a lower annular flange 12 which overlies the underside of the bottom wall. The reference character d (which equals 2R) denotes the effective diameter of the aperture which is defined by the insert 11 of FIG. 5. If the effective diameter of the aperture is to be increased, the insert 11 is simply removed from the respective aperture 3 of the bottom wall 2A. The insertion or removal of the preferably elastomeric inserts 11 takes up little time. As explained above, the radii R of apertures in the bottom wall of each tray influence the characteristic frequency of vibration of the respective tray when the column is in actual use and, therefore, the inserts 11 can be used to convert a conventional tray into one which satisfies the aforementioned equation and is thus capable of standing longer periods of use without aging, cracking and/or other deleterious effects of vibration which reduce the useful life of conventional trays.

If the manufacturer wishes to provide each tray 2 with a relatively thin bottom wall (see FIG. 4), such bottom wall is provided with suitably configured reinforcing nipples or nozzles 13 which extend beyond the upper side and/or beyond the underside of the bottom wall. The calculation of characteristic frequency of a tray embodying nozzles 13 of the type shown in FIG. 4 is a procedure which is more complex than the calculation of the characteristic frequency of a tray whose bottom wall is not provided with nozzles; however, such calculation does not present any problems to one who is familiar with the relevant calculating techniques.

Referring again to FIG. 1, there are shown anchoring elements 15 which are disposed between the neighboring trays 2 and serve as a reinforcing means for the bottom walls 2A. Other types of reinforcing elements can be used with equal or similar advantage. For example, and as shown in FIG. 3, the underside of each bottom wall 2A can be separably or permanently connected with one or more profiled reinforcing elements 14 (one indicated by phantom lines) which can be welded, bolted or otherwise secured to the bottom walls in such positions that they do not interfere with the ascent of vapors and/or gases through the apertures 3 of the bottom walls.

Experiments with the improved trays have shown that they are capable of longer-lasting continuous or discontinuous use than any heretofore known trays. For example, conventional trays were constructed in such a way that, in the equation $$f_\beta = \frac{3n}{2} \sqrt{\frac{2\sigma}{\rho_L R^3}},$$

the value of n was 0.52, i.e., approximately half the minimum value which is proposed in accordance with the present invention. When the conventional trays were in actual use, they were caused to vibrate at an excessive amplitude and 65 percent of all trays were destroyed or seriously damaged after a relatively short period of actual use. The bottom walls of the damaged trays exhibited pronounced fatigue cracks. Experiments with trays wherein the value of n was one or in excess of one have shown that such trays can stand incomparably longer periods of use without the development of any cracks.

An important advantage of the improved trays and of a column which embodies such trays is that excessive vibration of the trays can be prevented in advance, i.e., not as a result of experimentation and trial-and-error operations after the trays are constructed and installed in the shell of a column. If the characteristic frequency of a tray satisfies the aforediscussed equation, the designer knows in advance that the tray will not vibrate at an excessive amplitude and that, therefore, the tray will not develop cracks and/or other defects which are characteristic of conventional trays.

In order to reduce the thickness of the bottom wall of the improved tray, the value of n is preferably close to one and preferably does not exceed two. Thus, by the simple expedient of selecting a relative low value of n, the designer can achieve substantial savings in the material of trays. As a rule, the designer is given the desired inner diameter Di of the shell 1, the combined area of apertures 3 in the bottom wall of a tray, the height H of the body of liquid medium in each tray, as well as the density and surface tension of the liquid medium at operating temperatures. The designer then selects the thickness and the material of the bottom wall of each tray and calculates the characteristic frequency of the tray as discussed, for example, in "Handbook of Engineering Mechanics" by W. Flügge (published 1962 by The McGraw-Hill Book Company, New York, New York, Chapter 61.8, pages 16–21) or as provided for in the article entitled "Structural Analysis Program for Static and Dynamic Response of Linear Systems" appearing in "Computing Program SAP IV" by the College of Engineering, University of California, Berkeley, June 1973.

The extent to which the making of apertures weakens the bottom wall of a tray can be calculated accordance with "ASME Calculation Standards", Section 8, Division 2, FIG. 4-920.1, page 388 (published in 1972 by the United Engineering Center, 345 East 47th Street, New York, New York). In order to satisfy the aforediscussed equation, the designer of the trays then selects the radii R of the apertures 3 in the bottom walls of the trays to ensure that the trays will not vibrate at an excessive amplitude when the column is in actual use.

Another important advantage of the present invention is that it is now possible to modify many existing trays so as to prolong their useful life by the simple expedient of changing the effective height of their weirs. If the height of the weir is reduced, the height H of the body of liquid which is confined on the respective tray is also reduced. This entails an increase of the characteristic frequency of the respective tray. Thus, the useful life of the tray can be prolonged by the extremely simple and convenient expedient of changing the height of the weir and hence the characteristic frequency of the tray which contains a body of liquid medium. Such adjustments can be carried out after the trays are already installed in the shell of a column.

Existing trays can be modified so that their characteristic frequencies satisfy the aforediscussed equation by a further expedient, namely by utilizing inserts 11 of the type shown in FIG. 5 or analogous means for changing the effective areas of apertures in the bottom walls of the trays. If the effective areas of the apertures are increased (for example, by removing inserts 11 from the apertures 3 of the bottom walls of trays in an existing column), the characteristic frequency $f_\beta$ of the trays is reduced. Alternatively, inserts 11 having relatively small passages can be replaced with inserts having larger passages to thus again reduce the characteristic frequencies of the respective trays.

The provision of reinforcing elements (such as the element 14 shown in FIG. 3 and/or the anchoring elements 15 of FIG. 1) is desirable and advantageous when the height of the weirs in existing columns cannot be changed and when it is also impossible and/or impractical to change the effective areas of apertures in the bottom walls of the trays. Proper distribution of adequately dimensioned reinforcing elements also ensures that the characteristic frequency of the thus modified trays satisfies the aforediscussed equation because the reinforcing elements can influence the value of n.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A liquid containing tray for use in distillation columns, absorption columns and like apparatus, comprising a bottom wall having circular apertures and a characteristic frequency of vibration which satisfies the equation $$f_\beta = \frac{3n}{2} \sqrt{\frac{2\sigma}{\rho_L R^3}}$$

wherein n is a whole number including one, $\sigma$ is the surface tension of the body of liquid contained on the tray at the operating temperature of the column, $\rho_L$ is the density of such liquid at the operating temperature of the column and R is the radius of apertures in said bottom wall.

2. The tray of claim 1, further comprising a weir extending upwardly from said bottom wall and having a substantially vertically adjustable second wall, and means for adjustably securing said second wall to said bottom wall.

3. The tray of claim 1, further comprising inserts removably installed in said bottom wall and defining at least some of said apertures.

4. The tray or claim 3, wherein said bottom wall has an upper side and an underside and each of said inserts includes a hollow core extending between said sides and first and second flanges respectively adjacent to the upper side and the underside of said bottom wall.

5. The tray of claim 3, wherein said inserts consist of an elastomeric material.

6. The tray of claim 5, wherein said elastomeric material is rubber.

7. The tray of claim 5, wherein said elastomeric material is a synthetic plastic substance.

8. The tray of claim 1, further comprising reinforcing means for said bottom wall.

9. The tray of claim 8, wherein said reinforcing means is adjacent to the underside of said bottom wall.

10. The tray of claim 8, wherein said reinforcing means includes nozzles defining portions of said apertures and extending beyond at least one of the sides of the bottom wall.

11. The tray of claim 8, wherein said reinforcing means includes at least one profiled reinforcing element and means for securing said reinforcing element to said bottom wall.

12. The tray of claim 8, wherein said reinforcing means comprises at least one anchoring element arranged to secure the tray to the housing of the column and/or to a neighboring tray.

13. In a column, particularly in a distillation or absorption column, an upright tubular housing; and a plurality of neighboring liquid-containing trays disposed at different levels in the interior of said housing, each of said trays including a bottom wall having circular apertures and a characteristic frequency of vibration which satisfies the equation $$f_\beta = \frac{3n}{2} \sqrt{\frac{2\sigma}{\rho_L R^3}}$$

wherein n is a whole number including one, $\sigma$ is the surface tension of the body of liquid contained on the respective tray at the operating temperature of the column, $\rho_L$ is the density of such body of liquid at the operating temperature of the column and R is the radius of apertures in the respective bottom wall, said trays being staggered with reference to each other and having weirs for the overflow of liquid from tray to tray.

* * * * *